United States Patent
Horner et al.

(10) Patent No.: US 8,632,381 B2
(45) Date of Patent: Jan. 21, 2014

(54) LIGHTWEIGHT CABIN PRESSURE THRUST RECOVERY OUTFLOW VALVE

(75) Inventors: Darrell Horner, Oro Valley, AZ (US); Ross F. Meyer, Mesa, AZ (US); Albert Kang, Chandler, AZ (US); Kevin Prodromides, Tucson, AZ (US); Barry Fuhrmann, Gilbert, AZ (US); Karl Schroeder, Urbana, OH (US); Beth Miller, Scottsdale, AZ (US); David P. Gentile, Chandler, AZ (US); Govind Yadav, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 1054 days.

(21) Appl. No.: 12/651,823

(22) Filed: Jan. 4, 2010

(65) Prior Publication Data

US 2011/0165828 A1  Jul. 7, 2011

(51) Int. Cl.
*B64D 13/02* (2006.01)

(52) U.S. Cl.
USPC ............................................ 454/71; 244/129.5

(58) Field of Classification Search
USPC ............ 454/71, 75, 76; 244/1 N, 129.1, 129.5
See application file for complete search history.

(56) References Cited

U.S. PATENT DOCUMENTS

| | | | | |
|---|---|---|---|---|
| 3,544,045 A | * | 12/1970 | Butscher | 244/129.1 |
| 6,116,541 A | * | 9/2000 | Chuang et al. | 244/129.4 |
| 6,273,136 B1 | | 8/2001 | Steinert et al. | |

* cited by examiner

*Primary Examiner* — Eric Keasel
(74) *Attorney, Agent, or Firm* — Ingrassia Fisher & Lorenz, P.C.

(57) ABSTRACT

An aircraft cabin pressure control system outflow thrust recovery valve includes a frame, a valve element, and actuation hardware. The frame, valve element, and at least a portion of the actuation hardware are made of composite material. The actuation hardware is disposed external to the frame.

6 Claims, 6 Drawing Sheets

LIGHTWEIGHT CABIN PRESSURE THRUST RECOVERY OUTFLOW VALVE

TECHNICAL FIELD

The present invention relates generally to aircraft systems and, more particularly, to lightweight aircraft cabin pressure control system thrust recovery outflow valves.

BACKGROUND

Aircraft are commonly equipped with Cabin Pressure Control Systems (CPCSs), which maintain cabin air pressure within a desired range to increase passenger comfort during flight. A typical CPCS may include a controller, an actuator, and an outflow valve. The outflow valve is typically mounted on either a bulkhead of the aircraft or on the outer skin surface of the aircraft, and selectively fluidly couples the aircraft cabin and the atmosphere outside of the aircraft. During operation, the controller commands the actuator to move the outflow valve to various positions to control the rate at which pressurized air is transferred between the aircraft cabin and the outside atmosphere, to thereby control the pressure and/or rate of change of pressure within the aircraft cabin. The controller may be configured to command the actuator to modulate the outflow valve in accordance with a predetermined schedule or as a function of one or more operational criteria. For example, the CPCS may additionally include one or more cabin pressure sensors to sense cabin pressure and supply pressure signals representative thereof to the controller. By actively modulating the outflow valve, the controller may maintain aircraft cabin pressure and/or aircraft cabin pressure rate of change within a desired range.

In some aircraft, the outflow valve may be positioned on the aircraft outer skin surface such that when pressurized air is exhausted from the cabin, the exhausted air may provide additional forward thrust to the aircraft. Thus, outflow valves may sometimes be referred to as thrust recovery valves. Modern thrust recovery valves often contain two valve door elements to optimize the forward thrust that is created. Because of the pressure difference between the pressurized aircraft cabin and the outside atmosphere, and because of the potential energy of the pressurized air in the aircraft cabin, some thrust recovery valves have a rather distinctive shape. This shape accelerates the air as it passes between the thrust recovery valve door elements to provide a net aft thrust force.

Although thrust recovery valves, such as the one described above, are generally safe, reliable, and robust, these valves do exhibit certain drawbacks. For example, in order to maximize the produced thrust, the shapes of the valve door elements may be relatively complex. Moreover, because of the associated pressure load, the valve door elements are relatively robust in strength. Also, because of the very large aerodynamic loads during flight, the means of driving the valve door elements can be relatively complex, heavy, and expensive. In most instances, this results in the use of large swing arms being manufactured into the door elements to provide adequate mechanical advantage. Such swing arms do not inure to door elements being made of relatively lightweight materials, such as composite materials.

Hence, there is a need for a cabin pressure thrust recovery valve that is made of relatively lightweight materials, while at the same time having one or more valve door elements that may have relatively complex shapes, is relatively robust in strength, and/or does not have relatively large swing arms manufactured into the valve door elements. The present invention addresses at least this need.

BRIEF SUMMARY

In one embodiment, and by way of example only, an aircraft cabin pressure control system thrust recovery valve includes a frame, a first shaft, a second shaft, a valve element, a first swing arm, a master link, and a crank arm. The frame is configured to be mounted on an aircraft exterior skin, and has an inner surface and an outer surface. The inner surface defines a flow port through the frame. The first shaft is rotationally mounted on the valve frame. The first shaft extends through the frame between the inner surface and the outer surface, is coupled to receive a valve element drive torque, and is responsive to the drive torque to rotate about a hinge axis. The second shaft is rotationally mounted on the frame and is configured to rotate about the hinge axis. The valve element is disposed within the flow port and is coupled to the first shaft and the second shaft. The valve element is configured, in response to rotation of the first shaft, to rotate to between a closed position and a plurality of open positions. The first swing arm is disposed external to the frame and is rotationally coupled to the first shaft. The first swing arm is coupled to receive an actuation drive force and is responsive thereto to rotate and supply the valve element drive torque to the first shaft. The master link is disposed external to the frame and is rotationally coupled to the first swing arm. The master link is coupled to receive an input drive force and is responsive thereto to supply the actuation drive force to the first swing arm. The crank arm is disposed external to the frame and is rotationally coupled to the master link. The crank arm is adapted to receive an actuator output drive torque and is responsive thereto to rotate and supply the input drive force to the master link.

In another exemplary embodiment, an aircraft cabin pressure control system thrust recovery outflow valve includes a frame, a first shaft, a second shaft, a third shaft, a fourth shaft, an aft door, a forward door, a first swing arm, a master link, a crank arm, a second swing arm, and a slave link. The frame is configured to be mounted on an aircraft exterior skin, and has an inner surface and an outer surface. The inner surface defines a flow passage through the frame. The first shaft is rotationally mounted on the valve frame. The first shaft extends through the frame between the inner surface and the outer surface, and is coupled to receive an aft door drive torque and is responsive thereto to rotate about a first hinge axis. The second shaft is rotationally mounted on the frame and is configured to rotate about the first hinge axis. The third shaft is rotationally mounted on the valve frame. The third shaft extends through the frame between the inner surface and the outer surface, and is coupled to receive a forward door drive torque and is responsive thereto to rotate about a second hinge axis. The fourth shaft is rotationally mounted on the frame and is configured to rotate about the second hinge axis. The aft door is disposed within the flow port and is coupled to the first shaft and the second shaft. The aft door is configured, in response to rotation of the first shaft, to rotate to between a closed position and a plurality of open positions. The forward door is disposed within the flow port and is coupled to the third shaft and the fourth shaft. The forward door is configured, in response to rotation of the third shaft, to rotate to between a closed position and a plurality of open positions. The first swing arm is disposed external to the frame and is non-rotationally coupled to the first shaft. The first swing arm is coupled to receive an actuation drive force and is responsive thereto to rotate and supply the aft door drive torque to the first shaft. The master link is disposed external to the frame and is rotationally coupled to the first swing arm. The master link is coupled to receive an input drive force and is responsive thereto to supply the actuation drive force to the first swing arm. The crank arm is disposed external to the frame and is rotationally coupled to the master link. The crank arm is adapted to receive an actuator output drive torque and is responsive thereto to rotate and supply the input drive force to the master link. The second swing arm is disposed external to the frame and is rotationally coupled to the third shaft to supply the forward door drive torque thereto. The slave link is rotationally coupled between the first swing arm and the second swing arm.

In still another exemplary embodiment, a valve element includes a first side cap, a second side cap, an end cap, and a shell. The first side cap is formed of a composite material, and has a first shaft opening formed therein that has female anti-rotation features formed therein. The second side cap is formed of a composite material and is spaced apart from the first side cap. The second cap has a second shaft opening formed therein that has female anti-rotation features formed therein. The end cap is formed of a composite material and is disposed between the first and second side caps. The shell is formed of a composite material, and is coupled to and surrounds at least a portion of each of the first and second side caps and the end cap.

Other desirable features and characteristics of the present invention will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
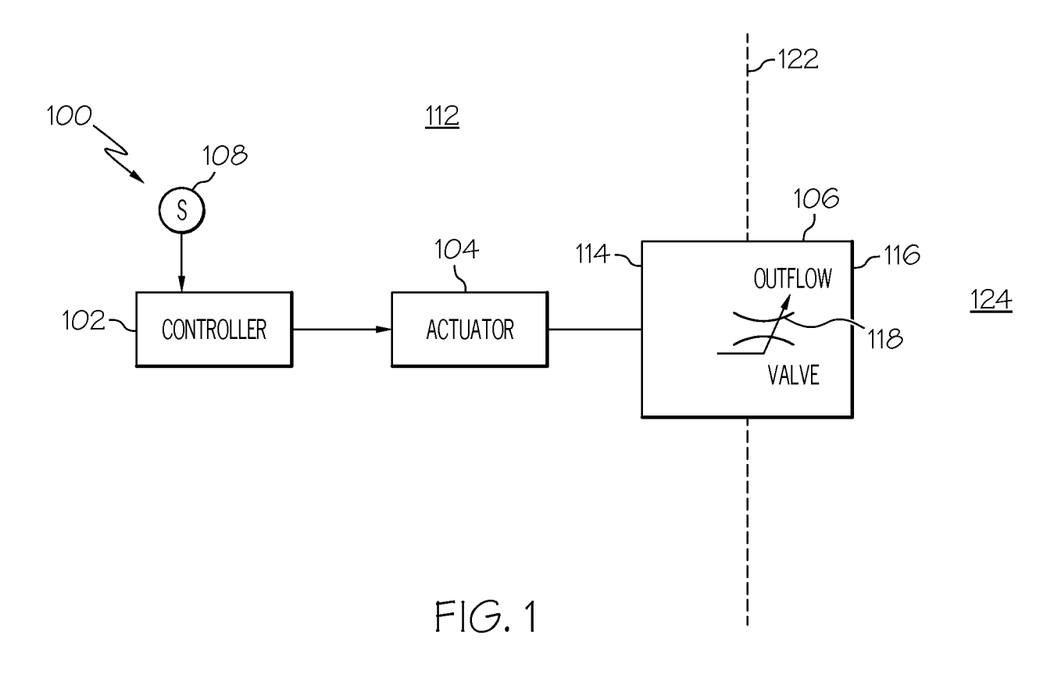
FIG. 1 is a functional block diagram of an exemplary cabin pressure control system (CPCS)

Turning first to FIG. 1, a simplified block diagram of an exemplary aircraft cabin pressure control system (CPCS) 100 is depicted. In the depicted embodiment, the CPCS includes a controller 102, an actuator 104, and an outflow valve 106. The controller 102 is operatively (e.g., electrically) coupled to the actuator 104, which is, in turn, mechanically coupled to the outflow valve 106. During operation of the CPCS 100, the controller 102 commands the actuator 104 to move the outflow valve 106 to various positions, to thereby modulate cabin pressure and/or cabin pressure rate-of-change.

It will be appreciated that the controller 102 may command the actuator 104 to move the outflow valve 106 in accordance with a predetermined schedule or as a function of one or more sensed parameters. In the depicted embodiment, the CPCS 100 further includes one or more cabin pressure sensors 108 (only one shown for clarity) that sense pressure within the aircraft cabin 112 and supply a cabin pressure sensor signal representative thereof to the controller 102. It will additionally be appreciated that the CPCS 100 may be implemented with various other sensors, such as one or more non-illustrated cabin temperature sensors, one or more non-illustrated cabin-to-atmosphere differential pressure sensors, one or more non-illustrated atmospheric temperature sensors, and one or more outflow valve position sensors, just to name a few.

Figure 2:
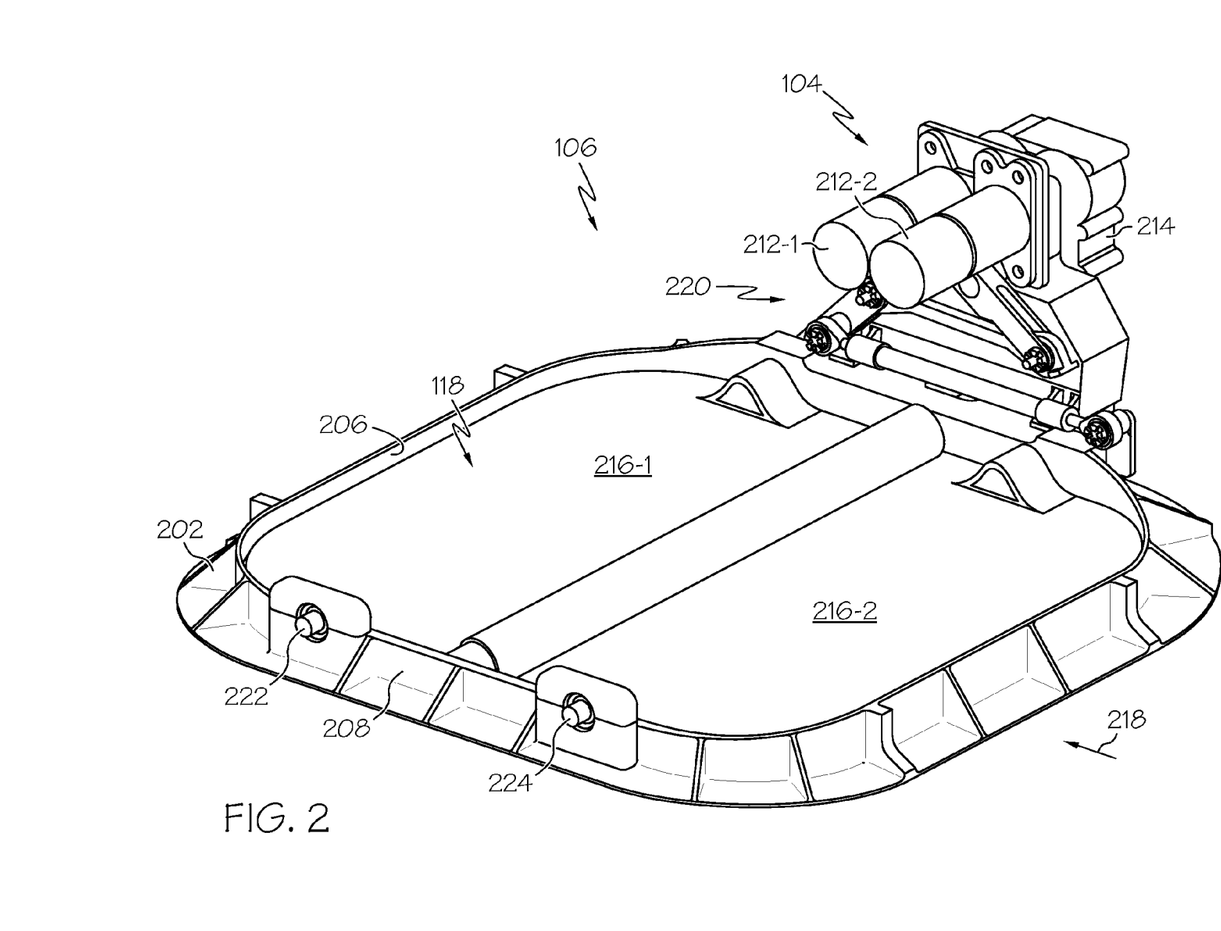
FIG. 2 is an isometric view of an exemplary embodiment of an outflow thrust recovery valve that may be used to implement the exemplary CPCS shown in FIG. 1.

The outflow valve 106 includes an inlet flow port 114, an outlet flow port 116, and an interposed valve element 118. The outflow valve 106 is, for example, preferably mounted on the aircraft exterior skin 122 such that the inlet flow port 114 is exposed to the aircraft cabin 112 and the outlet flow port 116 is exposed to the atmosphere outside of the aircraft 124. Thus, during flight the pressure in the aircraft cabin 112 (e.g., cabin altitude) and/or the rate of change of aircraft cabin altitude, can be controlled by positioning the valve element 118, via the actuator 104. In one specific implementation, the outflow valve 106 is located in the rear underbelly of the aircraft proximate the tail. Moreover, in some implementations, the outflow valve 106 may be positioned so that additional forward thrust is supplied to the aircraft when pressurized air is venting from the aircraft cabin 112 to the atmosphere 124 outside the aircraft. It will be appreciated that the outflow valve 106 may be variously configured to implement this functionality. One particular physical implementation is depicted in FIG. 2, and with reference thereto will now be described.

The exemplary physical implementation of the outflow valve 106 includes a frame 202, the valve element 118, and the actuator 104. The frame 202 is configured to be mounted on the aircraft exterior skin 122, and includes an inner surface 206 and an outer surface 208. The inner surface 206 defines a flow passage 210 through the frame, between the inlet flow port 114 and the outlet flow port 116. The valve element 118 is rotationally coupled to the frame 202, and is coupled to receive an actuation drive force from the actuator 104. In the depicted embodiment, the actuator 104 is mounted on the outflow valve 106, and is more particularly coupled to the outer surface 208 of the frame 202. Although the actuator 104 may be variously configured and implemented, in the depicted embodiment, the actuator 104 is implemented using a plurality of electrical motors 212 (e.g., 212-1, 212-2) and a gear set 214. The motors 212 are each adapted to receive actuation commands from the controller 102 (not shown in FIG. 2) and are each operable, upon receipt thereof, to supply a drive torque. The gear set 214 is coupled between each of the motors 212 and the valve element 118, and receives the drive torque from one or both of the motors 212. The gear set 214, upon receipt of the drive torque from one or both of the motors 212, supplies an actuator output torque to actuation hardware 220, which in turn supplies the actuation drive force to the valve element 118.

The valve element 118, in response to the actuation drive force it receives from the actuation hardware 220, rotates to a position between a closed position and a plurality of open positions. It is noted that the position of the valve element 118 during flight is typically a partially open position, intermediate the fully closed position (shown in FIG. 2) and fully open position (not depicted). Although the valve element 118 may be variously configured and implemented, in the depicted embodiment the valve element is implemented using two doors 216—a first door 216-1 and a second door 216-2—that are each rotationally coupled to the frame 202.

Before proceeding further, it was noted above that in some embodiments the outflow valve 106 may be located in the rear underbelly of the aircraft proximate the tail. Moreover, and as shown via airflow arrow 218 in FIG. 2, the outflow valve 106 is preferably mounted such that second door 216-2 is closer to the front of the aircraft than the first door 216-1. For this reason, the first door 216-1 and second door 216-2 may also be referred to herein as the aft door 216-1 and the forward door 216-2, respectively.

Returning once again to the description, and with continued reference to FIG. 2, it may be seen that the aft door 216-1 is rotationally coupled to the frame 202 via a plurality of first shafts 222 (only one visible), and the forward door 216-2 is rotationally coupled to the frame 202 via a plurality of second shafts 224 (only one visible). More particularly, the aft door 216-1 is coupled to the first shafts 222, which are disposed within suitable openings in the frame 202 and are configured to rotate relative to the frame 202, and the forward door 216-2 is coupled to the second shafts 224, which are also disposed within suitable openings in the frame 202 and are configured to rotate relative to the frame 202.

Figure 3:
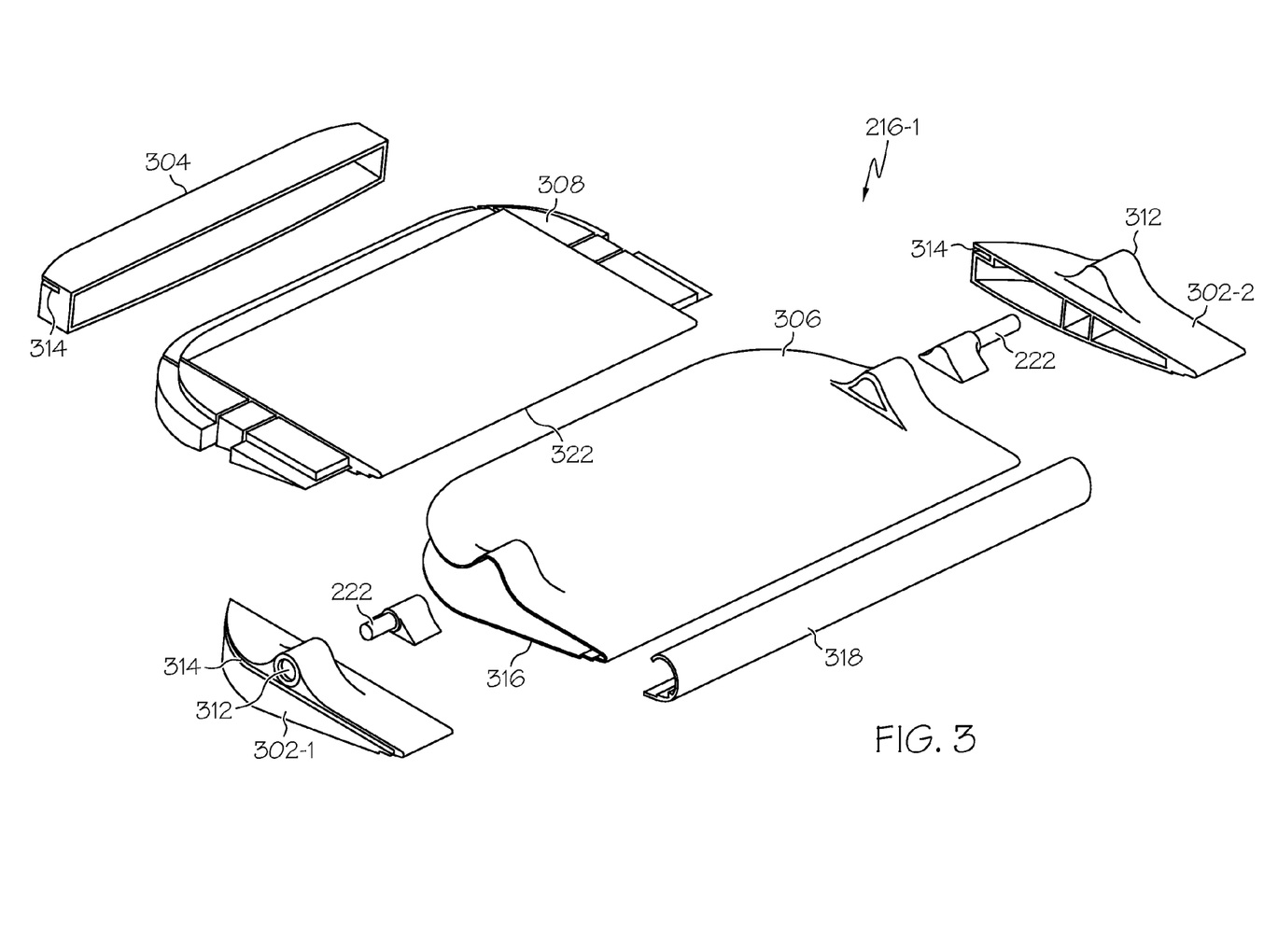
FIGS. 3 and 4 are exploded views of alternative exemplary valve door elements that may be used to implement the outflow thrust recovery valve of FIG. 2.

Turning now to FIG. 3, an exploded view of an embodiment of one of the doors 216 is depicted. Although only the aft door 216-1 is depicted in FIG. 3, it will be appreciated that the forward door would be similarly constructed. The forward and aft doors 216 each include a two side caps 302 (e.g., a first side cap 302-1 and a second side cap 302-2), an end cap 304, a shell 306, and a center core 308. The side caps 302 are disposed within, and are at least partially surrounded by, the shell 306. The side caps 302 are preferably made from a lightweight material such as, for example, aluminum and/or composite. The side caps 302 each include a suitable opening 312 within which one of the first shafts 222 or second shafts 224 is disposed, as the case may be. The side caps 302 additionally each include a female anti-rotation feature to mate with the first shafts 222 or the second shafts 224, as the case may be. Although the anti-rotation features may be variously implemented and configured, in one particular embodiment the anti-rotation features are implemented as female splines. Preferably, the female anti-rotation features are made of a suitably strong and wear resistant material such as, for example, steel, and are disposed completely within the associated side cap 302 so that the door 216 movement occurs purely as a result of torque applied to the anti-rotation feature via one of the first or second shafts 222, 224.

The end cap 304 is also disposed within, and is at least partially surrounded by, the shell 306. The end cap 304, similar to the side caps 302, is also preferably made from a lightweight material such as, for example, aluminum and/or composite. The side caps 302 are preferably dimensioned to comprise the entire extent of each side of the door 216, and the end cap is preferably dimension to comprise the entire extend of the end of the door 216. The side caps 302 and the end cap 304 will also preferably each include a seal groove 314. The seal grooves in each cap 302, 304 are be aligned, and non-depicted door seals are disposed within the seal grooves.

The side 302 and end 304 caps are preferably bonded to the shell 306. Thus, each cap 302, 304 is preferably configured with a sufficiently large surface area to create a significant mechanical bond with the shell 306. In those embodiments in which the caps 302, 304 are made of aluminum, the caps 302, 304 are preferably treated with a coating to prevent corrosion of the aluminum.

The shell 306 is preferably made of a composite material using, for example, a hand layup or resin transfer molding process. Although the specific composite material may vary, in one particular embodiment the composite material comprises a resin matrix material containing carbon-fiber reinforcement. The resin matrix material may vary, and may include, for example, T300 6K 5HS/E765 Graphite Fabric/Epoxy. If a layup is used to make the carbon fiber reinforced resin matrix, the carbon-fiber layers may be oriented such that the fibers provide reinforcement in several directions. If a resin transfer molding (RTM) process is used, the orientations of the carbon fibers can be varied using a braided carbon-fiber pre-form that has multiple directions.

Though not depicted in FIG. 3, the atmosphere side 316 of the shell 306 may include an embedded layer of conductive material, such as copper mesh. This conductive layer, if included, will dissipate a direct lightning strike. The conductive layer is preferably connected to at least one bonding strap that can conduct the electrical energy from a lightning strike to a system ground. In some embodiments the shell 306 may also include seal grooves, rather that the end cap 304.

The center core 308 is disposed within the shell 306 and is also partially disposed within the side caps 302 and the end cap 304, and thus fills the inner hollow space defined by the caps 302, 304 and the shell 306. The center core 308 may be made from various materials, but in a preferred embodiment it is made of a foam having sufficient density to withstand the assembly processes for the doors 216. One example of a suitable foam is ROHACELL RC51A. No matter its particular material composition, the center core 308 is preferably preformed to the geometry needed to fit within the caps 302, 304 and shell 306.

As FIG. 3 also depicts, the aft door 216-1 may additionally include a curved bellmouth 318. The bellmouth 318, if included, is preferably made of resin matrix material containing carbon-fiber reinforcement, such as T300 6K 5HS/E765 Graphite Fabric/Epoxy, and is coupled to the aft door 216-1 proximate its sealing edge 322. Due to its curved geometry, the upstream face of the bellmouth 318 conditions pressurized airflow through outflow valve 106 to promote laminar flow, to decrease the production of noise, and to increase the production of forward thrust. The bellmouth 318 may be designed to provide optimal flow conditioning in its normal cruise position, which may be, for example, a partially open position offset from the fully closed position (FIG. 3).

Figure 4:
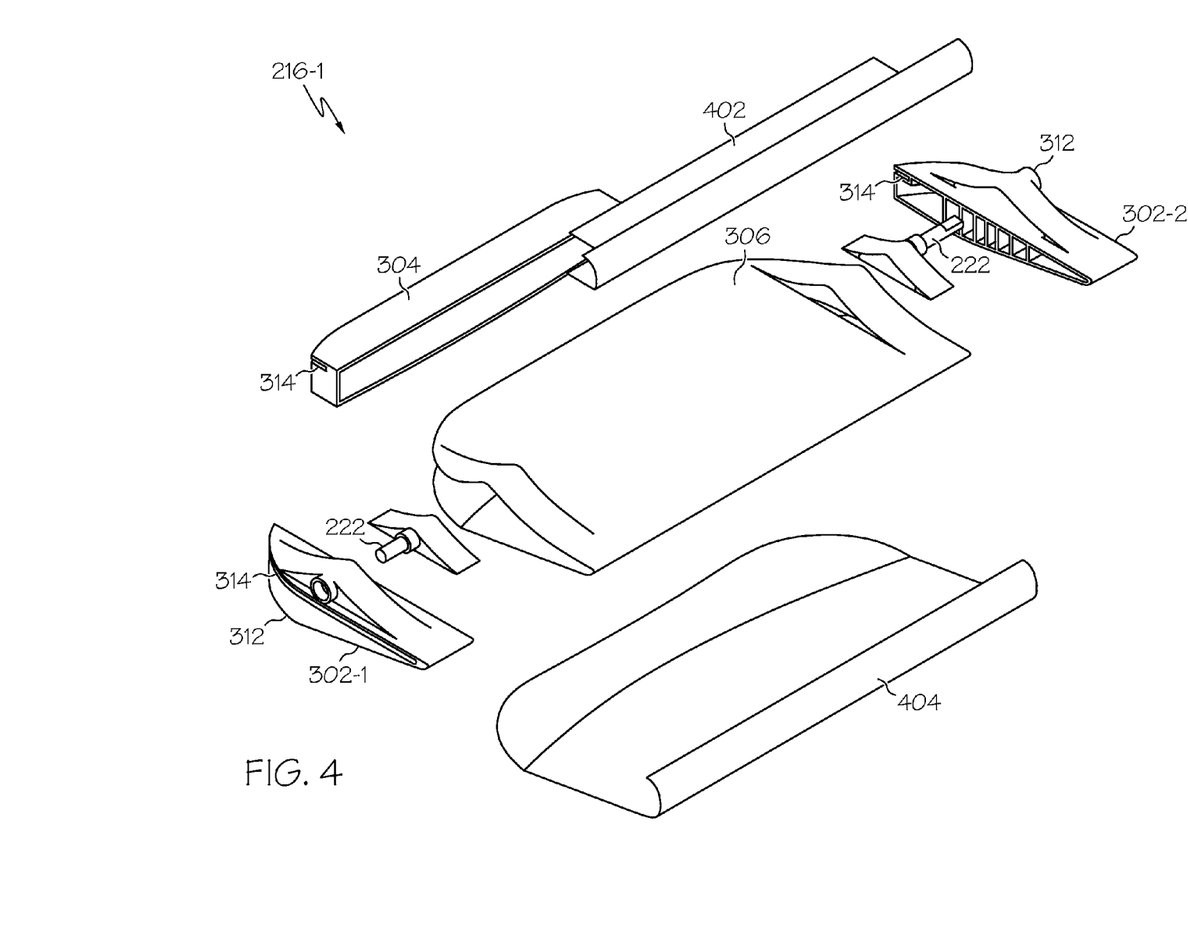

An exploded view of second embodiment of one of the aft door 216-1 is depicted in FIG. 4. It includes the same components as the embodiment depicted in FIG. 3, and thus includes like reference numerals to refer to these like components. However, this second embodiment additionally includes an outer bellmouth structure 402 and an inner bellmouth structure 404. In this embodiment, the outer bellmouth structure 402 and the inner bellmouth structure 404 are bonded to different surfaces of the shell 306, and are also bonded together to form the curved bellmouth 318. It will be appreciated that although the center core 308 is, for clarity, not depicted in FIG. 4, it may be included in this embodiment, if needed or desired.

Figure 5:
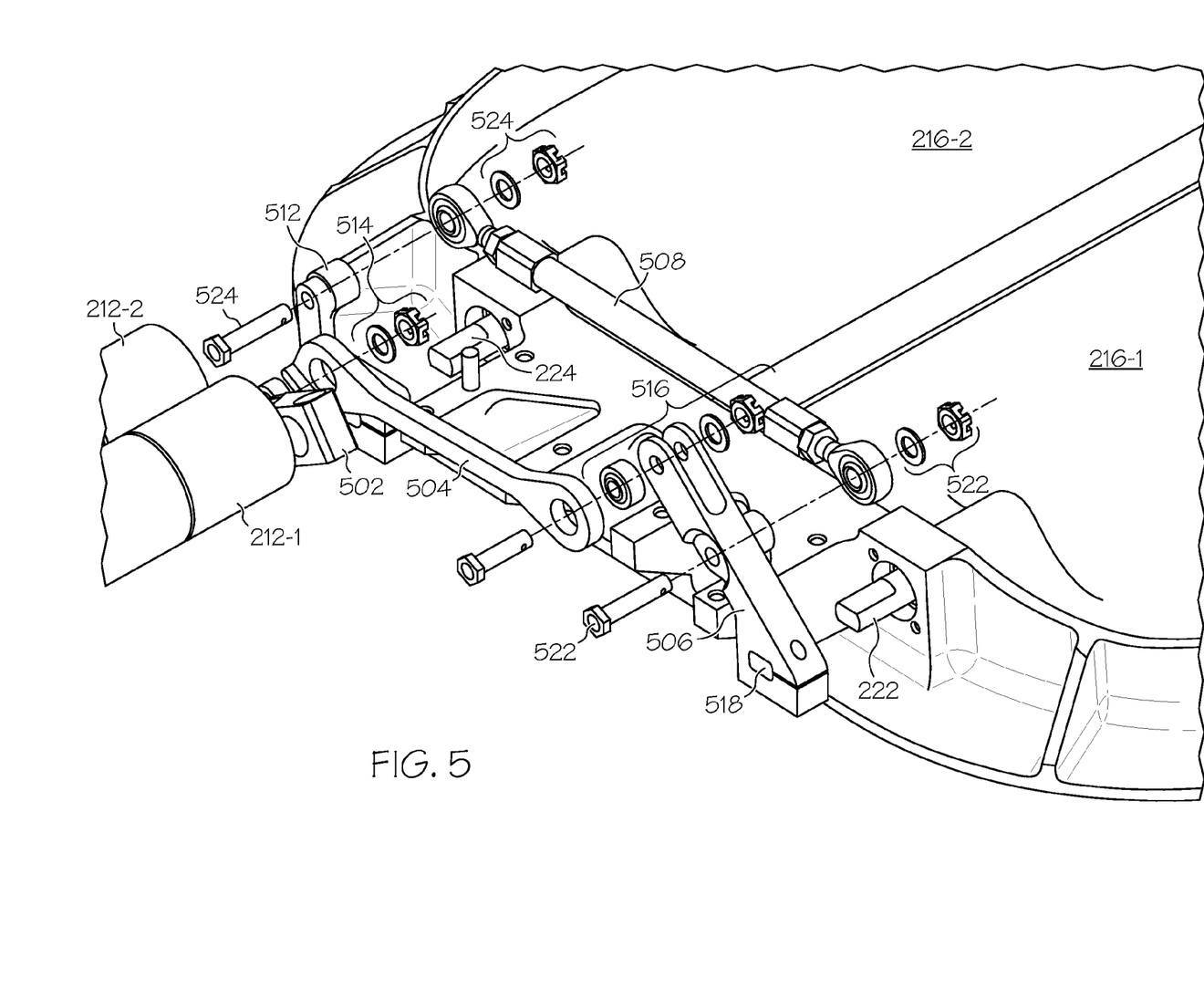
FIGS. 5 and 6 are each close-up, exploded views of a portion of the exemplary outflow thrust recovery valve of FIG. 2, from two different perspectives, illustrating exemplary actuation hardware.
Figure 6:
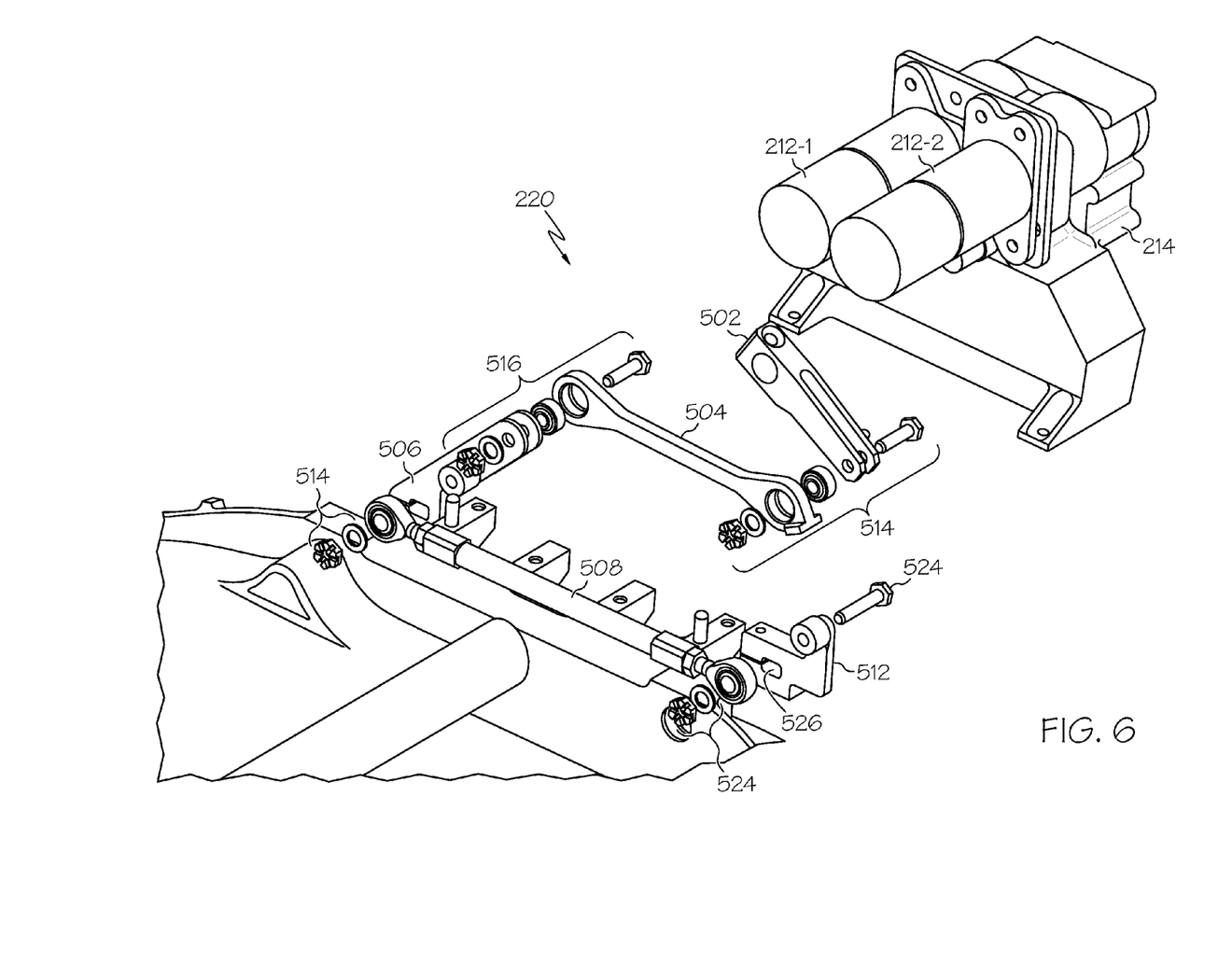

Referring now to FIGS. 5 and 6, a preferred embodiment of the actuation hardware 220 will be described. The actuation hardware 220, as noted above, supplies the actuation drive force to the valve element 118. More specifically, at least in the depicted embodiment, the actuation hardware 220 receives the actuator output drive torque from the gear set 214 and simultaneously supplies a valve element drive torque to one of the first shafts 222 and to one of the second shafts 224, to thereby rotate the aft and forward doors 216-1, 216-2. The actuation hardware 220 is entirely separate from the forward and aft doors 216-1, 216-2, is disposed entirely external of the valve frame 202, and includes a crank arm 502, a master link 504, a first swing arm 506, a slave link 508, and a second swing arm 512. The crank arm 502 is rotationally coupled to the master link 504 via suitable hardware 514, and is additionally coupled to receive the actuator output drive torque from the gear set 214. The crank arm 502, upon receipt of the actuator output drive torque, rotates and supplies an input drive force to the master link 504.

The master link 504 is rotationally coupled to the first swing arm 506 via suitable hardware 516 and, upon receipt of the input drive force from the crank arm 502, supplies an actuation drive force to the first swing arm 506. The first swing arm 506 is non-rotationally coupled to one of the first shafts 222. In the depicted embodiment the first swing arm 506 includes a shaft slot 518 within which an end of one of the first shafts 222 is disposed. No matter the manner in which the first swing arm 506 is non-rotationally coupled to one of the first shafts 222, the first swing arm 506 is responsive to the actuation drive force supplied thereto from the master link 504 to rotate and supply a valve element drive torque to the first shaft 222 to which it is coupled.

The slave link 508 is rotationally coupled, via suitable hardware 522 and 524, between the first swing arm 506 and the second swing arm 512. The second swing arm 512 is non-rotationally coupled to one of the second shafts 224. Similar to the first swing arm 506, the second swing arm 512, at least in the depicted embodiment, includes a shaft slot 526 (see FIG. 6) within which an end of one of the second shafts 224 is disposed. Because the slave link 508 is coupled to both the first swing arm 506 and the second swing arm 512, when the first swing arm 506 rotates, it supplies a drive force, via the slave link 508, to the second swing arm 512. The second swing arm 512, in response to the drive force, rotates and supplies a valve element drive torque to the second shaft 224 to which it is coupled.

The crank arm 502, master link 504, first swing arm 506, slave link 508, and second swing arm 512 may be constructed using various suitable materials. In various embodiments, one or more of these components may be constructed, at least partially, of a composite material. Thus further reducing the overall weight of the thrust recovery valve 106.

While described above in the context of an exemplary cabin pressure control system, it should be appreciated that embodiments of the outflow valve may be utilized in various other avionic and non-avionic applications where it is desirable to provide accurate, direct position indication of a valve element. In such alternative applications, the outflow valve may be utilized to regulate the flow of fluids other than pressurized air. Furthermore, although the above-described exemplary outflow valve employed two (i.e., forward and aft) rotatable doors, alternative embodiments of the outflow valve may include any suitable number of rotatable doors or other such valve elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft cabin pressure control system thrust recovery outflow valve, comprising:
    a frame configured to be mounted on an aircraft exterior skin, the frame having an inner surface and an outer surface, the inner surface defining a flow passage through the frame;
    a first shaft rotationally mounted on the frame, the first shaft extending through the frame between the inner surface and the outer surface, the first shaft coupled to receive an aft door drive torque and responsive thereto to rotate about a first hinge axis;
    a second shaft rotationally mounted on the frame and configured to rotate about the first hinge axis;
    a third shaft rotationally mounted on the frame, the third shaft extending through the frame between the inner surface and the outer surface, the third shaft coupled to receive a forward door drive torque and responsive thereto to rotate about a second hinge axis;
    a fourth shaft rotationally mounted on the frame and configured to rotate about the second hinge axis;
    an aft door disposed within the flow port and coupled to the first shaft and the second shaft, the aft door configured, in response to rotation of the first shaft, to rotate to between a closed position and a plurality of open positions;
    a forward door disposed within the flow port and coupled to the third shaft and the fourth shaft, the forward door configured, in response to rotation of the third shaft, to rotate to between a closed position and a plurality of open positions;
    a first swing arm disposed external to the frame and non-rotationally coupled to the first shaft, the first swing arm coupled to receive an actuation drive force and responsive thereto to rotate and supply the aft door drive torque to the first shaft;
    a master link disposed external to the frame and rotationally coupled to the first swing arm, the master link coupled to receive an input drive force and responsive thereto to supply the actuation drive force to the first swing arm;
    a crank arm disposed external to the frame and rotationally coupled to the master link, the crank arm adapted to receive an actuator output drive torque and responsive thereto to rotate and supply the input drive force to the master link;
    a second swing arm disposed external to the frame and rotationally coupled to the third shaft; and
    a slave link rotationally coupled between the first swing arm and the second swing arm.

2. The thrust recovery outflow valve of claim 1, further comprising:
    an actuator coupled between the frame and the crank arm, the actuator adapted to receive actuation commands and operable, in response thereto, to supply the actuator output drive torque to the crank arm.

3. The thrust recovery outflow valve of claim 2, wherein the actuator comprises:
    a plurality of motors, each motor adapted to receive actuation commands and operable, upon receipt thereof, to supply a drive torque; and
    a gear set coupled between each of the motors and the crank arm, the gear set coupled to receive the drive torque from at least one of the motors and operable, upon receipt thereof, to supply the actuator output drive torque to the crank arm.

4. The thrust recovery outflow valve of claim 1, wherein the forward and aft doors each comprise:
   a first side cap and a second side cap, each side cap coupled to one of the first, second, third, or fourth shafts; and
   a shell coupled to and surrounding at least a portion of each of the first and second side caps.

5. The thrust recovery outflow valve of claim 4, wherein the first side cap, the second side cap, and the shell are formed of a composite material.

6. The thrust recovery outflow valve of claim 4, wherein:
   the shell is formed of a composite lay-up material; and
   the first and second side caps are each formed of a molded composite.

\* \* \* \* \*